United States Patent
Drane

(10) Patent No.: US 8,153,895 B2
(45) Date of Patent: Apr. 10, 2012

(54) WEATHERPROOF WHILE-IN-USE ELECTRICAL BOX COVER WITH INSERTABLE HINGE PIN

(75) Inventor: Mark R. Drane, Germantown, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 282 days.

(21) Appl. No.: 12/691,035

(22) Filed: Jan. 21, 2010

(65) Prior Publication Data

US 2010/0181091 A1 Jul. 22, 2010

Related U.S. Application Data

(63) Continuation of application No. 61/146,151, filed on Jan. 21, 2009.

(51) Int. Cl.
*H02G 3/14* (2006.01)
(52) U.S. Cl. ............... 174/66; 174/67; 33/528; 439/135
(58) Field of Classification Search .................... 174/66, 174/67; 220/241, 242; 33/528; 439/135
See application file for complete search history.

(56) References Cited

U.S. PATENT DOCUMENTS

| | | |
|---|---|---|
| 300,441 A | 6/1884 | Borst |
| 1,270,076 A | 6/1918 | Waitt |
| 1,540,581 A | 6/1925 | Way |
| 2,732,581 A * | 1/1956 | Heck .............................. 220/840 |
| 2,919,045 A | 12/1959 | Waugh et al. |
| 3,962,750 A | 6/1976 | Buss et al. |
| 4,993,963 A * | 2/1991 | Pedigo .......................... 439/142 |
| 6,133,531 A | 10/2000 | Hayduke et al. |
| 6,476,321 B1 | 11/2002 | Shotey et al. |
| 6,700,063 B2 | 3/2004 | Shotey et al. |
| 6,806,426 B1 | 10/2004 | Gretz |
| 6,879,483 B2 * | 4/2005 | Johnson et al. ............. 312/265.5 |
| 6,891,104 B2 | 5/2005 | Dinh |
| 6,894,223 B1 | 5/2005 | Shotey et al. |
| 6,921,861 B1 | 7/2005 | Gretz |
| 6,979,777 B2 | 12/2005 | Marcou et al. |
| 7,071,415 B1 | 7/2006 | Shotey et al. |
| 7,235,740 B2 | 6/2007 | Dinh |
| 7,241,952 B2 | 7/2007 | Dinh |
| 7,304,238 B1 | 12/2007 | Shotey et al. |
| 7,368,662 B1 | 5/2008 | Shotey et al. |
| 7,396,997 B2 | 7/2008 | Dinh |
| 7,439,444 B1 | 10/2008 | Maltby et al. |
| 7,462,777 B2 | 12/2008 | Dinh |
| 7,521,632 B2 * | 4/2009 | Johnson .......................... 174/67 |
| 7,598,453 B1 | 10/2009 | Shotey et al. |
| 7,619,162 B2 | 11/2009 | Dinh et al. |
| 7,626,121 B1 * | 12/2009 | Cleghorn ......................... 174/66 |
| 7,830,672 B1 * | 11/2010 | Kitchen ......................... 361/818 |

(Continued)

*Primary Examiner* — Dhirubhai R Patel
(74) *Attorney, Agent, or Firm* — Hoffmann & Baron, LLP

(57) ABSTRACT

The present invention provides a weatherproof while-in-use electrical box cover. The box cover includes a base having a back wall including an opening therein for accessing an electrical outlet and permetrical base side walls extending thereabout defining an open front face. The box cover further includes a hood having a front wall for covering the open front face of the base and permetrical hood side walls extending therefrom. The hood is matable with the base and including a cooperative mating assembly on respective side walls for defining a pivot location for pivotally attaching the hood to the base. A hinge pin is insertably connected to the cooperative mating assemblies for hingedly attaching the hood to the base and the hinge pin is configured to non-releaseably engage with the cooperative mating assembly.

16 Claims, 6 Drawing Sheets

U.S. PATENT DOCUMENTS

| | | |
|---|---|---|
| 7,935,889 B1 * | 5/2011 | Cleghorn .................. 174/66 |
| 2005/0082081 A1 | 4/2005 | Marcou et al. |
| 2006/0191702 A1 | 8/2006 | Dinh |
| 2007/0235206 A1 | 10/2007 | Dinh |
| 2008/0223601 A1 | 9/2008 | Johnson |
| 2008/0296039 A1 | 12/2008 | Dinh et al. |

* cited by examiner

WEATHERPROOF WHILE-IN-USE ELECTRICAL BOX COVER WITH INSERTABLE HINGE PIN

CROSS-REFERENCE TO RELATED APPLICATIONS

This application claims priority to U.S. Provisional Application No. 61/146,151, filed Jan. 21, 2009 which is incorporated herein by reference.

FIELD OF INVENTION

The present invention relates to a while-in-use cover that encloses an electrical device. More particularly, the present invention relates to a weatherproof while-in-use cover having a separate hinge pin to provide a secure hinge area.

BACKGROUND

Electrical boxes are used for a variety of applications wherein it is necessary to provide a termination point for electrical wires for splicing or connection to an electrical component. An electrical box is rigidly mounted on or in a wall in such locations to conveniently locate an electrical component. Depending on the application and location, electrical boxes can be mounted either in a horizontal or vertical orientation. Once mounted, the wires are installed and connected to the electrical component therein.

Due to varied needs for electrical power and switching, it is sometimes necessary to mount a box in a location where it will be exposed to wet conditions. Typically, such installations can include an outdoor receptacle to provide electricity for lighting, power tools, or appliances. When used in a location where the connector box will be exposed to water, it is necessary to provide for structure to ensure that water does not enter the box and thereby damage the components. An effective way to prevent water from entering an electrical box is to provide a cover which provides weatherproof protection.

It is also desirable to have an electrical connector box cover that can provide a weatherproof seal, with an exchangeable faceplate wherein the cover can be adapted to be used with a connector box that is mounted in either a horizontal or vertical orientation. It would be useful for the cover to be adapted to be hingedly opened when the faceplate is oriented in either the horizontal or vertical direction without the need to modify the cover or the faceplate and provide a locking mechanism whereby the cover can be secured regardless of which position the box is mounted. One such electrical box cover having a hood and a base is shown and described in commonly assigned U.S. Pat. No. 7,235,740 issued on Jun. 26, 2007, entitled Hinged Weatherproof Electrical Box Cover, which is incorporated by reference herein for all purposes.

While this cover serves adequately for its intended purpose, it employs an integrated hinge pin. In order to allow the hinge to snap into place, the hood has to be manipulated at odd angles. The hinge area may be weak and the hood could become loose after being used over time.

Also during manufacturing previous while-in use electrical box covers requires removable cams in the mold to make the pin opening. This has larger up-front costs and requires more time during production run.

Accordingly, it is desirable to provide a while-in-use electrical box that has a simpler mold that provides a faster turnaround time during production, is easily assembled. It is also desirable to provide a sturdier hinge area that permanently locks into place and will not loosen over time.

SUMMARY OF THE INVENTION

The present invention provides a weatherproof while-in-use electrical box cover. The box cover includes a base having a back wall including an opening therein for accessing an electrical outlet and permetrical base side walls extending thereabout defining an open front face. The box cover further includes a hood having a front wall for covering the open front face of the base and permetrical hood side walls extending therefrom. The hood is matable with the base and including a cooperative mating assembly on respective side walls for defining a pivot location for pivotally attaching the hood to the base. A hinge pin is insertably connected to the cooperative mating assemblies for hingedly attaching the hood to the base and the hinge pin is configured to non-releaseably engage with the cooperative mating assembly.

The present invention further provides a weatherproof while-in-use electrical box cover. The box cover includes a base having a back wall including an opening for accessing an electrical outlet and permetrical base side walls extending thereabout defining an open front face. The box cover further includes a hood having a front wall for covering the open front face of the base and permetrical hood side walls extending therefrom. The hood is matable with the base and includes a cooperative mating assembly on respective side walls for defining a pivot location for pivotally attaching the hood to the base. The cooperative mating assembly includes a first mating assembly having a first hood mating assembly and a first base mating assembly having a first orientation from one of the base side walls. The mating assembly further includes a second mating assembly, having a second hood mating assembly and a second base mating assembly having a second orientation from another of the side walls. The first mating assembly defines a first pivot location for pivotally attaching the hood to the base at a first orientation. The second mating assembly defines a second pivot location for pivotally attaching the hood to the base at a second orientation. A hinge pin is insertably connected to one of the following selected from the group consisting of the first mating assembly and the second mating assembly. The hinge pin is configured to hingedly attach the hood to the base, and to non-releaseably engage with the cooperative mating assembly.

DETAILED DESCRIPTION OF DRAWINGS

Figure 1A:
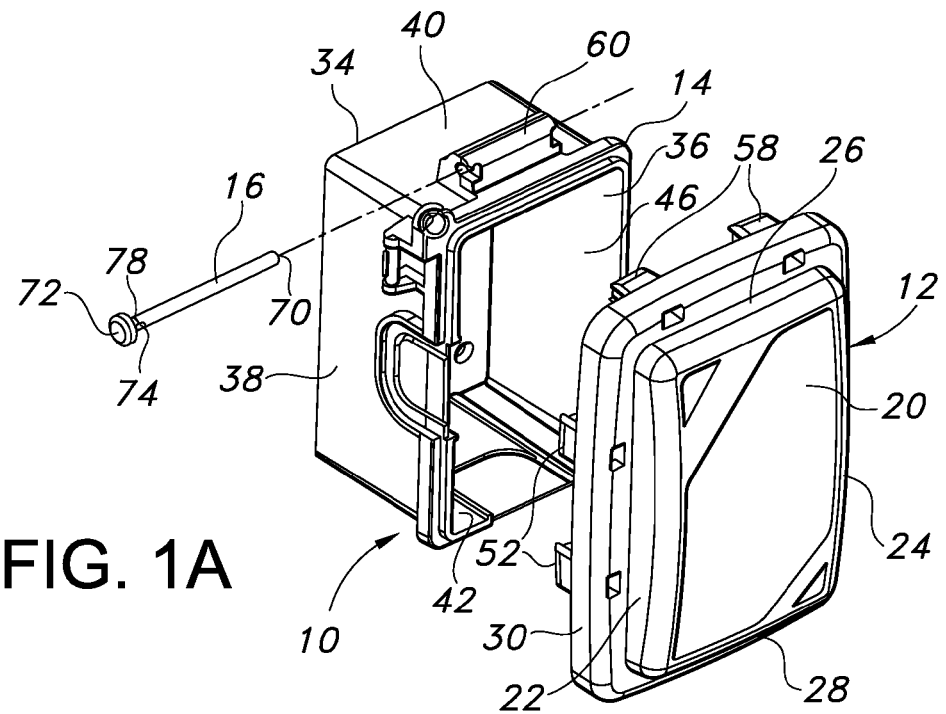
FIGS. 1A and 1B are perspective showings of the box cover of the present invention arranged in a vertical and horizontal orientation, respectively.

The present invention is a while-in-use electrical box cover that can be assembled using a separate hinge pin that non-releaseably locks into a hinge area to create a stronger hinged connector between a hood and a base. The while-in-use electrical box cover includes a hood that is pivotally mounted to a base, forming a box-like structure.

Turning to FIGS. 1A, 1B, 2A, 2B, 3, and 4, an embodiment of an electrical box cover 10 having a hood 12, a base 14, and a hinge pin 16 is shown. The electrical box cover 10 is configured with the hood 12 being matable with the base 14 via a cooperative mating assembly formed at separate locations thereon.

The hood 12 has a substantially flat, rectangular front wall 20 and hood side walls 22, 24, 26, 28 permetrically thereabout that extend downwardly from the front wall 20 and terminate in an edge 30 (preferably, a flanged edge) to form the box-like structure with an open face 32. The base 14 has a substantially flat, rectangular back wall 34 with an opening for accessing an electrical outlet and side walls 36, 38, 40, 42 permetrically thereabout that form the box-like structure with an open front face 46. The dimensions of the box-like structure are selected so that, when the hood 12 is positioned over the base 14, the flanged edge 30 of the hood 12 contacts the side walls 36, 38, 40, 42 of the open face 32 of the base 14.

The side walls 36, 40 of the base 14 and the side walls 22, 24 of the hood 12 each contain a pivot location for pivotally attaching the hood 12 and the base 14. The pivot locations include a cooperative mating assembly integrally molded into the hood 12 and the base 14 respectively. The cooperative mating assembly provided may include a first mating assembly 50, including a first hood mating assembly 52 and a first base mating assembly 54. The cooperative mating assembly may further provide a second mating assembly 56, including a second hood mating assembly 58 and a second base mating assembly 60. Each mating assembly contains a hinge aperture 62 configured to receive the hinge pin 16. The mating assembly may be configured to fully encircle the hinge pin 16, adding strength to the pivot location and preventing the hood 12 and the base 14 from separating.

One or more of the side walls of the hood, for example side wall 24 may further include one or more receiving tabs 64 and one or more of the side walls of the base 14, for example side walls 36, 38 may further include one or more extending tabs 66, configured to be releasably engaged and when engaged, to securely connect the hood 12 and the base 14.

Figure 3:
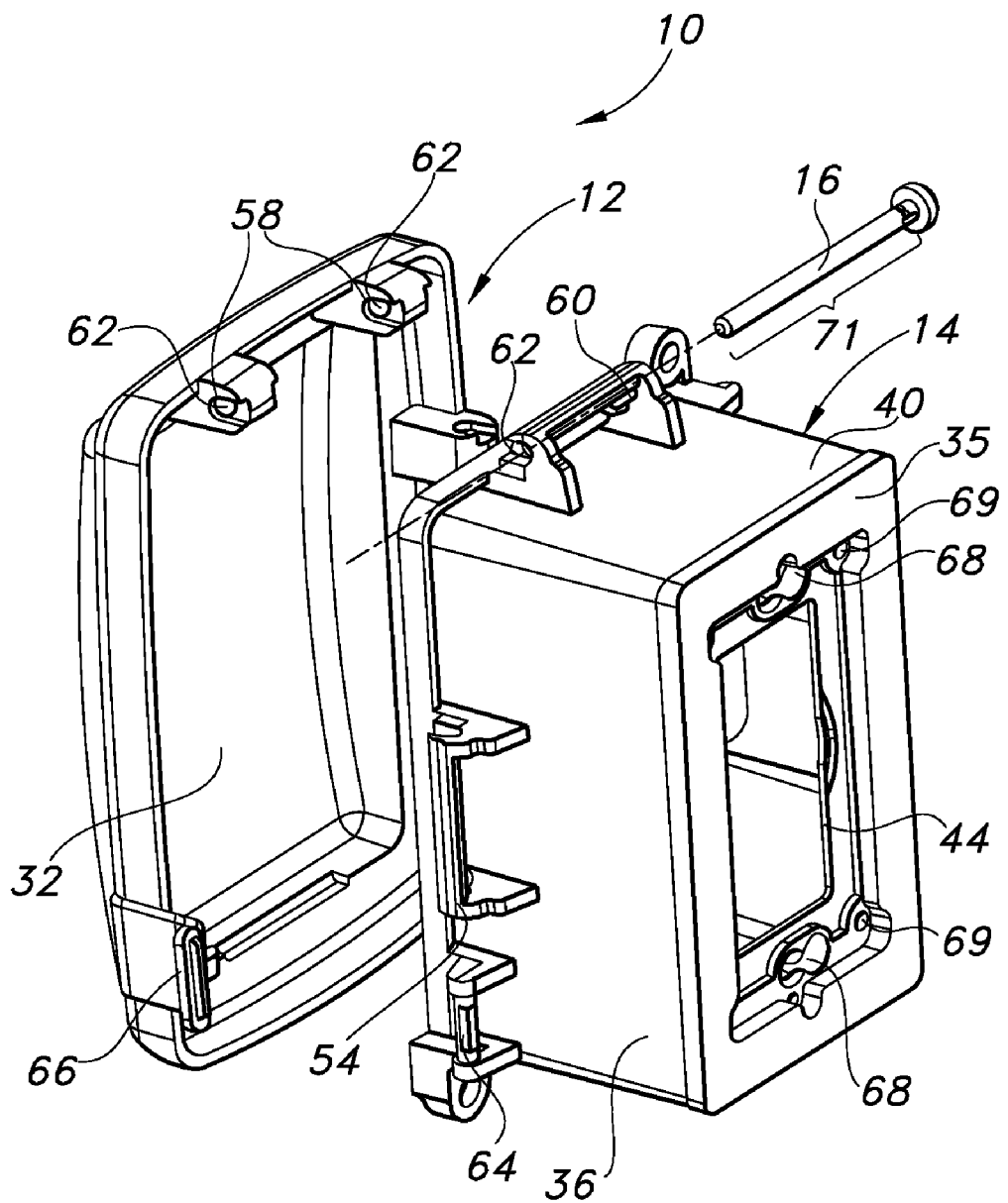
FIG. 3 is a rear perspective showing of the box cover with an insertable hinge pin.
Figure 4:
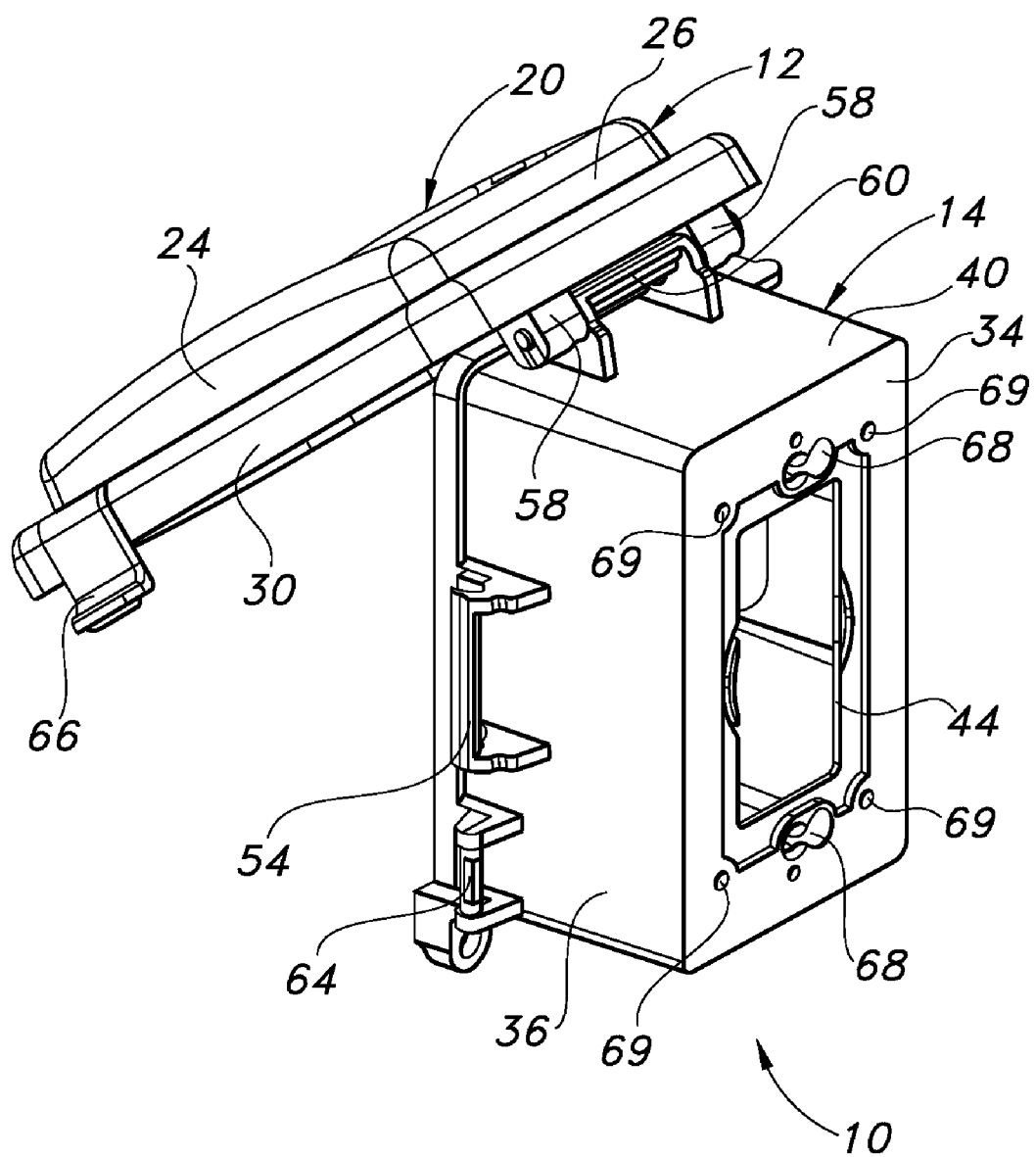
FIG. 4 is a rear perspective view of the box cover of FIG. 3 with the hinge pin inserted.

The back wall 34 of the base 14 having the opening 44 for an electrical device, may also have mounting apertures 68 for mounting screws or other fasteners on a typical electrical receptacle. The size and location of the opening 44 for the electrical device and the location and number of mounting apertures 68 may vary according to the size of the electrical device. For example, the opening 44 may be substantially rectangular in shape when the electrical device is a GFCI or a switch, as shown in FIGS. 3-4. Alternatively, the opening 44 may include two apertures for socket faces of an electrical receptacle (not shown). As will be recognized by those skilled in the art, the present invention contemplates the base 14 having a variety of apertures or adapter plates for use with a variety of electrical devices including, but not limited to the examples of the opening 44 and the mounting apertures 68 described herein.

The base may optionally include one or more drill apertures 69 on the back wall 34 of the base 14. The drill apertures 69 may be pre-drilled prior to installation or drilled out during installation from pre-marked holes on the base 14. Screws may be inserted into the drill apertures 69 after the base 14 is attached to the electrical receptacle. Four drill apertures 69 are shown in FIG. 4; however, as one skilled in the art may appreciate, the location and number of drill apertures 69 may vary according to the electrical device.

The back wall 34 of the base 14 may further include a gasket 35, as shown in FIG. 3. The gasket 35 forms a seal between the electrical box and the base 14. On irregular flat surfaces, such as brick or wood siding, caulk or sealant may also be applied around the base 14 to provide additional protection and block water entry.

Figure 5A:
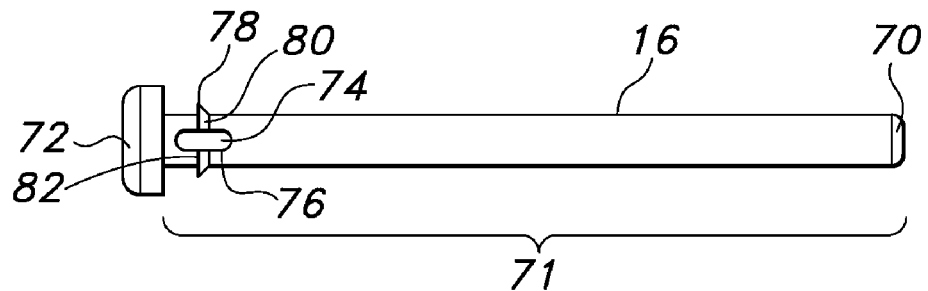
FIG. 5A is a side plan view of the hinge pin of FIG. 3.
Figure 5B:
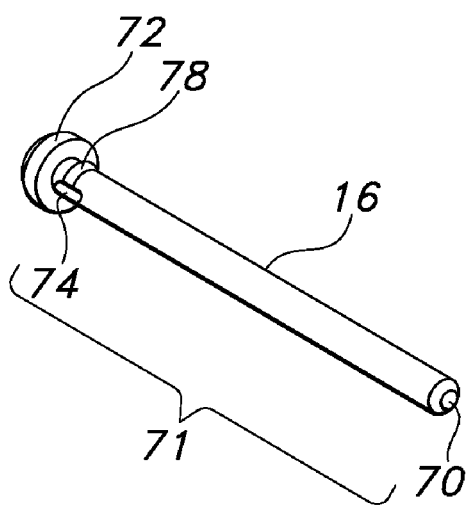
FIG. 5B is a perspective showing of the hinge pin of FIG. 5A.
Figure 5C:
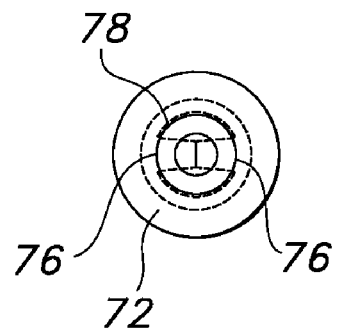
FIG. 5C is an end view of the hinge pin of FIG. 5A.

The hinge pin 16, as shown in FIGS. 5A-5C, is an individual component, separate from the hood 12 and the base 14. The hinge pin 16 includes an elongated stem 71 round in shape having a chamfered end 70 at one end and a head 72 at the other end. Adjacent to the head 72 on the stem 71 is an oblong aperture 74 therethrough. The aperture 74 defines a pair of opposed open faces 76. A pair of locking ribs 78 are positioned between the pair of open faces 76 and extend outwardly from the stem 71 with a sloped ramp 80 configuration to allow easy insertion, and a perpendicular wall 82 at the end of the ramp 80 to prevent movement of the hinge pin once inserted.

The hinge pin 16 is configured to be laterally inserted into the hinge aperture 62 of the mating assembly 52, 54 or 58, 60 approximately the length of the mating assembly 52, 54 or 58, 60. As it is being inserted, the oblong aperture 74 provides for inward deflection of the stem 71 thereat so that the sloped ramp 80 of the ribs 78 ride past the hinge aperture 62 without being damaged and the stem 71 may be easily inserted therethrough. Thereafter, the stem 71 diametrically returns and the ribs 78 lock in place, preventing removal of the pin.

For example, in FIGS. 3-4 the hood 12, the base 14, and the hinge pin 16 are shown prior to and after being assembled respectively. The hinge pin 16 is configured such that the hinge pin 16 may slide freely through the mating assembly 58, 60 until approximately the last 1/8" at which point the locking ribs 78 are pushed inward, towards the oblong aperture 74. The oblong aperture 74 allows the locking ribs 78 to move inward, slightly deforming the round shape of the stem 71 of the hinge pin 16 during insertion and allows for easy insertion of the hinge pin 16 during installation. Once the hinge pin 16 is fully inserted in the mating assembly 58, 60 stem 71 returns to its original shape allowing the locking ribs 78 to move outward and return to their locking position. When the hinge pin 16 is fully inserted in the mating assembly 58, 60 the head 72 and the perpendicular wall 82 of the locking ribs 78 non-releaseably lock the hinge pin 16 into the hinge aperture 62. Thus, the hinge pin 16 may be easily inserted into the hinge aperture 62 to assemble the electrical box cover 10, while securing the hood 12 and the base 14 to prevent the pivot location from easily loosening.

Figure 6:
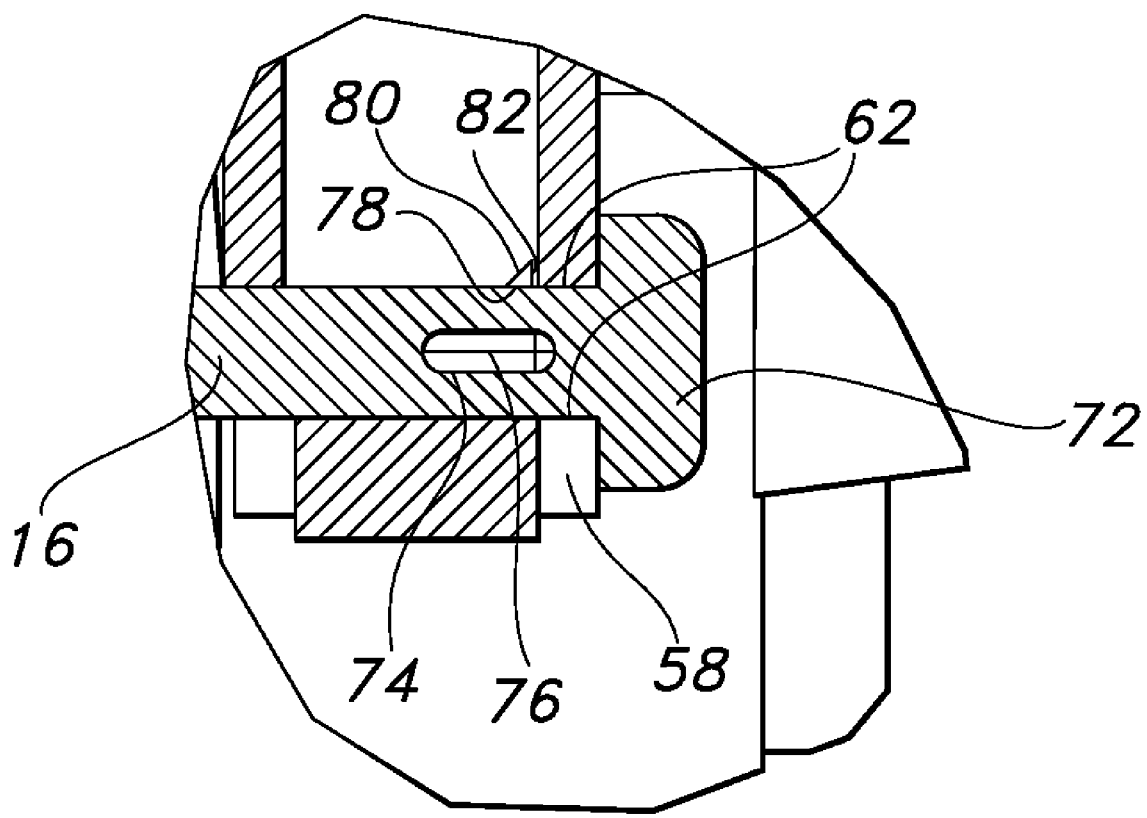
FIG. 6 is an enlarged view of the hinge pin inserted in a cooperative mating assembly of the box cover.

FIG. 6 provides a detailed view of the hinge pin 16 with the locking ribs 78 and the head 72 hingedly securing the hood 12 and the base 14 by locking the hinge pin 16 between the first hood mating assembly 52 and the first base mating assembly 54, or the second hood mating assembly 58 and the second base mating assembly 60. In particular, the hinge pin 16 in FIG. 6 is configured to prevent horizontal movement by positioning the head 72 and the perpendicular wall 82 of the locking ribs 78 on either side of one hinge aperture 62. Additionally, the head 72 of the hinge pin 16 is preferably configured to be flat. The flat configuration allows the head 72 to remain close to the mating assemblies 52, 54 or 58, 60 when the hinge pin 16 is fully inserted into the hinge aperture 62, making the hinge pin 16 difficult to grasp. The design of the hinge pin 16 with the flat head 72 also provides additional assurances that the hinge pin 16 will remain permanently locked into the hinge aperture 62 and prevent separation of the hood 12 and the base 14 due to loosening at the pivot location.

Figure 1B:
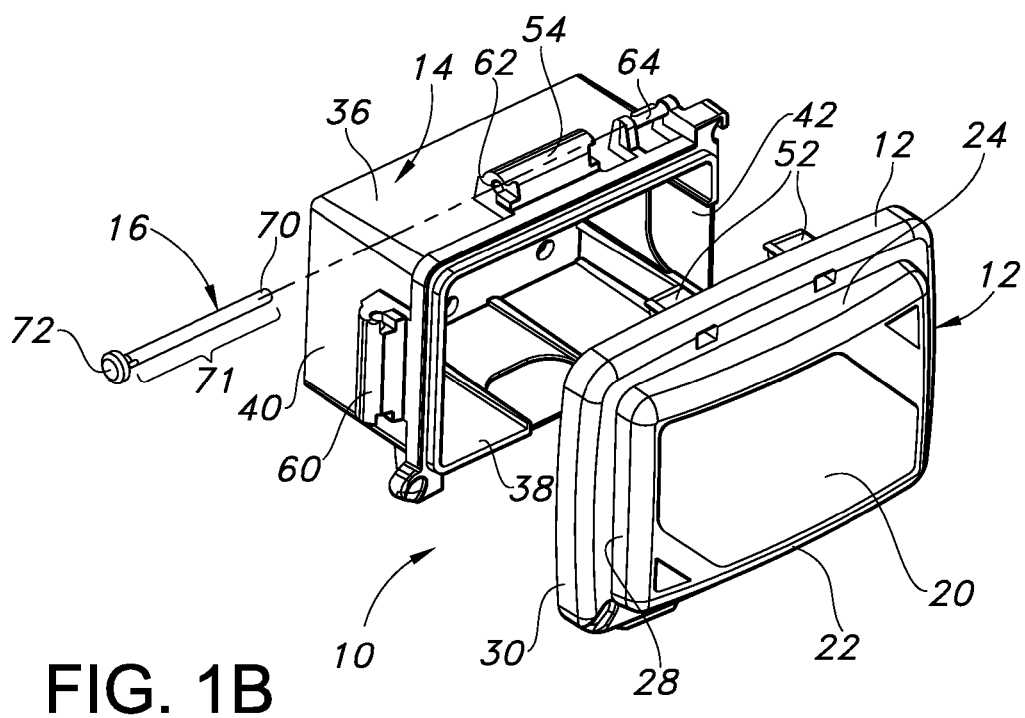
Figure 2A:
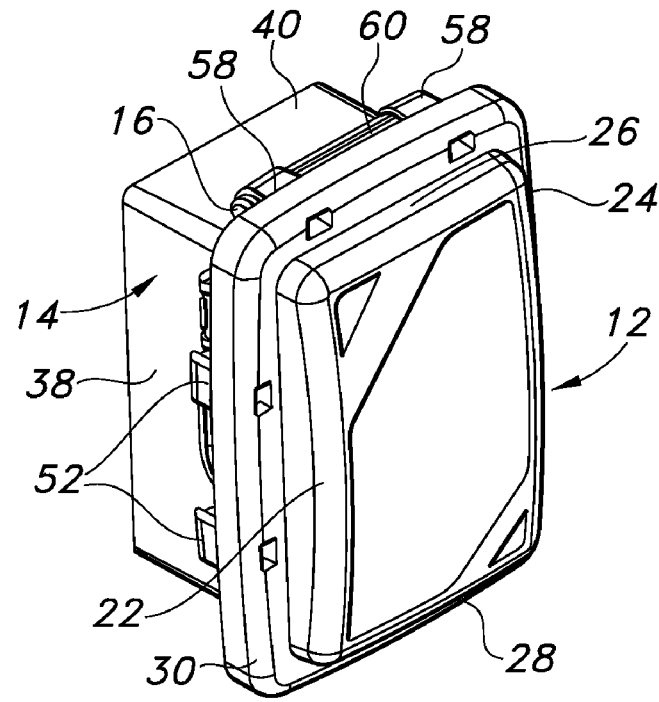
FIGS. 2A and 2B are perspective showings of the box cover of FIGS. 1A and 1B.
Figure 2B:
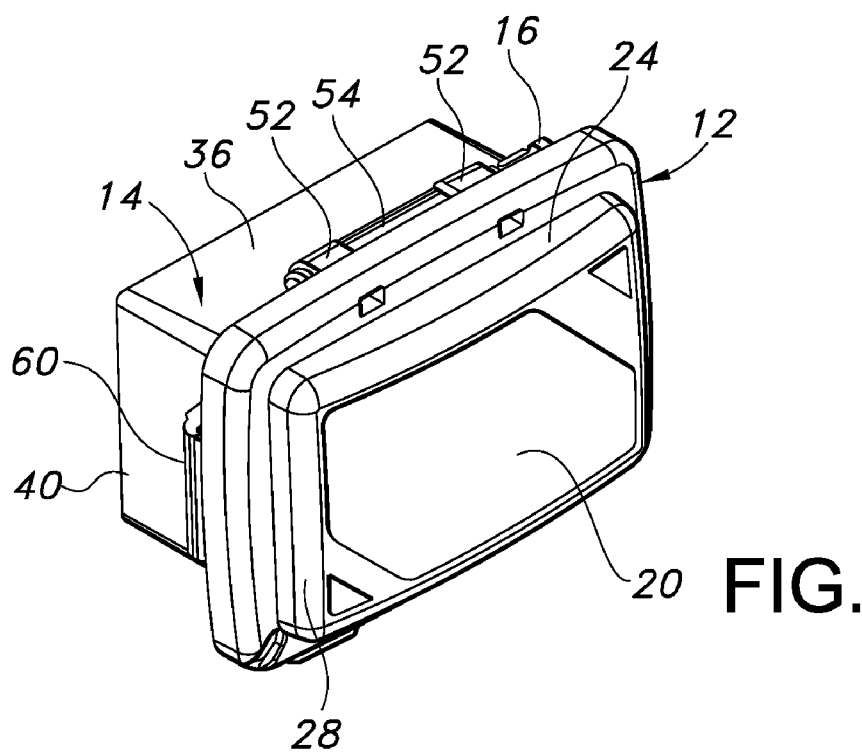

FIGS. 1A and 2A illustrate an additional view of the electrical box cover 10 being assembled vertically, and FIGS. 1B and 2B illustrate the electrical box cover 10 being assembled horizontally. The hood 12 and the base 14 may be configured to be assembled vertically or horizontally, as desired. Additionally, since the hinge pin 16 is a separate component, the hinge pin 16 may be inserted after the desired horizontal or vertical orientation of the box cover 10 is selected and aligned. Note, after the hinge pin 16 is inserted and locked in the hinge aperture 62, the box cover 10 orientation cannot be changed because the hinge pin 16 is not releasable or removable.

A benefit of this invention is that the hinge area is designed to be sturdier than prior electrical box covers. Since the hinge pin 16 is separate from the hood 12 and the base 14, the hinge area is less likely to crack. Additionally, use of a separate hinge pin 16 that permanently locks into the hinge aperture prevents the hood 12 and the base 14 of the present invention from separating. A further benefit is the use of a simpler mold in the manufacturing of the electrical box cover. The simpler mold does not require the use of removable cams to make the pin openings, which reduces the up-front costs and provides a faster turnaround time during production. This is accomplished by hinge pin 16 being fully surrounded by the combination of assemblies 52, 54 or 58, 60. Each individual assembly (52, 54, 58, 60) only partially surrounds hinge pin 16 which eliminates the need for removable pin cams in the mold.

Yet another advantage is that the present invention is simple and versatile, enabling the manufacture of only one electrical box cover 10 for use with both vertical and horizontal electrical component configurations. Since one box may be installed for both vertical and horizontal orientations, the installer may determine the best orientation of the electrical box cover 10 on-site.

Various changes to the foregoing described and shown structures will now be evident to those skilled in the art. Accordingly, the particularly disclosed scope of the invention is set forth in the following claims.

What is claimed:

1. A weatherproof while-in-use electrical box cover comprising:
   a base having a back wall including an opening therein for accessing an electrical outlet and permetrical base side walls extending thereabout defining an open front face;
   a hood having a front wall for covering said open front face of said base and permetrical hood side walls extending therefrom;
   said hood being matable with said base, each of said hood and said base having a cooperative mating assembly on respective side walls for defining a pivot location for pivotally attaching said hood to said base; and
   a hinge pin insertably connected to each of said cooperative mating assemblies for hingedly attaching said hood to said base; said hinge pin further including a chamfered end, a head and at least one locking rib, wherein said chamfered end and said head are located at opposite ends of said hinge pin and said at least one locking rib is positioned adjacent said head;
   wherein each mating assembly includes a hinge pin aperture and said hinge pin is insertable into each of said hinge pin apertures such that said locking rib of said hinge pin non-releasably engages said mating assembly adjacent said apertures.

2. The electrical box cover of claim 1, wherein said mating assembly includes a first mating assembly having a first hood mating assembly and a first base mating assembly having a first orientation from one of said base side walls.

3. The electrical box cover of claim 2, further comprising a second mating assembly, including a second hood mating assembly and a second base mating assembly having a second orientation from another of said side walls.

4. The electrical box cover of claim 2, wherein said first mating assembly is configured having a vertical orientation.

5. The electrical box cover of claim 4, wherein said second mating assembly is configured having a horizontal orientation.

6. The electrical box cover of claim 1, wherein said permetrical hood side walls terminate in an edge to form a box-like structure with an open face.

7. The electrical box cover of claim 1, wherein said back wall further includes one or more mounting apertures for accommodating said electrical outlet.

8. The electrical box cover of claim 1, wherein said base further comprises a receiving tab and said hood further includes an extending tab, said receiving tab and said extending tab configured to be releasably engaged.

9. The electrical box cover of claim 1, wherein said mating assembly is generally rounded having a small hinge aperture extending longitudinally therebetween.

10. The electrical box cover of claim 9, wherein said mating assembly is configured to fully encircle said hinge pin.

11. A weatherproof while-in-use electrical box cover comprising:
    a base having a back wall including an opening thereby for accessing an electrical outlet and permetrical base side walls extending thereabout defining an open front face;
    a hood having a front wall for covering said open front face of said base and permetrical hood side walls extending therefrom;
    said hood being matable with said base and each of said hood and said base having a cooperative mating assembly on respective side walls for defining a pivot location for pivotally attaching said hood to said base;
    said cooperative mating assembly includes a first mating assembly having a first hood mating assembly and a first base mating assembly having a first orientation from one of said base side walls;
    said mating assembly further includes a second mating assembly, having a second hood mating assembly and a second base mating assembly having a second orientation from another of said side walls;
    said first mating assembly defining a first pivot location for pivotally attaching said hood to said base at a first orientation;
    said second mating assembly defining a second pivot location for pivotally attaching said hood to said base at a second orientation;
    a hinge pin insertably connected to one of the following selected from the group consisting of said first mating assembly and said second mating assembly; and
    said hinge pin configured to hingedly attach said hood to said base; said hinge pin including a chamfered end, a head, at least one locking rib, and an oblong aperture with two open faces, wherein said chamfered end and said head are located at opposite ends of said hinge pin and said at least one locking rib extends between said two open faces;
    wherein each mating assembly includes a hinge pin aperture and said hinge pin is insertable into each of said hinge pin apertures such that said locking rib of said hinge pin non-releasably engages said mating assembly adjacent said apertures.

12. The electrical box cover of claim 11, wherein said first mating assembly is configured having a horizontal orientation.

13. The electrical box cover of claim 12, wherein said second mating assembly is configured having a vertical orientation.

14. The electrical box cover of claim 11, wherein said base further comprises a receiving tab and said hood further includes an extending tab, said receiving tab and said extending tab configured to be releasably engaged.

15. The electrical box cover of claim 14, wherein said mating assembly is configured to fully encircle said hinge pin.

16. The electrical box cover of claim 11, wherein said mating assembly is generally rounded having a small hinge aperture extending longitudinally therebetween.

* * * * *